US008089640B2

(12) United States Patent
Adams

(10) Patent No.: US 8,089,640 B2
(45) Date of Patent: Jan. 3, 2012

(54) PRINTER CONFIGURATION DETERMINED BY FORMAT ON A PRINT MEDIUM

(75) Inventor: Jürgen Adams, Villingen-Schwenningen (DE)

(73) Assignee: Continental Automotive GmbH, Hannover (DE)

( * ) Notice: Subject to any disclaimer, the term of this patent is extended or adjusted under 35 U.S.C. 154(b) by 1281 days.

(21) Appl. No.: 10/598,913

(22) PCT Filed: Mar. 10, 2005

(86) PCT No.: PCT/EP2005/051067
§ 371 (c)(1),
(2), (4) Date: Sep. 14, 2006

(87) PCT Pub. No.: WO2005/091231
PCT Pub. Date: Sep. 29, 2005

(65) Prior Publication Data

US 2007/0182975 A1 Aug. 9, 2007

(30) Foreign Application Priority Data

Mar. 17, 2004 (DE) ........................ 10 2004 013 160

(51) Int. Cl.
*G06K 15/00* (2006.01)

(52) U.S. Cl. ...................................................... 358/1.12

(58) Field of Classification Search .................. 358/1.12
See application file for complete search history.

(56) References Cited

U.S. PATENT DOCUMENTS

| | | | | |
|---|---|---|---|---|
| 4,644,368 | A | 2/1987 | Mutz | 346/33 D |
| 5,965,862 | A | 10/1999 | Momose | 235/449 |
| 6,068,187 | A * | 5/2000 | Momose | 235/449 |
| 6,182,896 | B1 | 2/2001 | Momose | 235/449 |
| 6,290,129 | B2 | 9/2001 | Momose | 235/449 |
| 6,392,677 | B1 * | 5/2002 | Lais | 346/33 D |
| 6,633,393 | B1 | 10/2003 | Fukano | 358/1.12 |
| 6,731,393 | B1 | 5/2004 | Currans et al. | 358/1.12 |
| 2001/0001471 | A1 | 5/2001 | Momose | 235/449 |
| 2001/0045452 | A1 | 11/2001 | Momose et al. | 235/379 |
| 2005/0134673 | A1 * | 6/2005 | Bendek | 347/215 |

FOREIGN PATENT DOCUMENTS

| | | |
|---|---|---|
| DE | 42 10 105 | 3/1992 |
| DE | 199 83 647 | 10/1998 |
| DE | 600 02 546 | 6/1999 |

(Continued)

OTHER PUBLICATIONS

International Preliminary Report on Patentability , PCT/EP2005/051067, 7 pgs, Jun. 9, 2005.

*Primary Examiner* — Charlotte M Baker
*Assistant Examiner* — Fred Guillermety
(74) *Attorney, Agent, or Firm* — King & Spalding L.L.P.

(57) ABSTRACT

On operation of a printer for a digital tachograph in a motor vehicle, the input of the specification for the desired print is regularly time-consuming and error-prone due to the deep menu structure of the user guide. A solution is provided whereby the print medium (3), in addition to the size format, comprises an additional layout (21) and the print unit (12) of the printer (2) outputs a particular content of the impression on the print medium (3) depending on the embodiment thereof. The user can thus specify the desired content of the impression with selection of a print medium (3) for an advantageous sectional introduction.

20 Claims, 3 Drawing Sheets

FOREIGN PATENT DOCUMENTS

| | | | |
|---|---|---|---|
| EP | 0 191 413 | A2 | 2/1986 |
| EP | 0 809 208 | | 5/1997 |
| EP | 0 895 199 | A2 | 2/1999 |
| EP | 1 008 455 | | 12/1999 |
| EP | 0918222 | B1 | 1/2002 |
| GB | 2 254 292 | | 10/1992 |
| WO | 0023948 | | 4/2000 |
| WO | 0076199 | | 12/2000 |
| WO | 2004/017264 | A1 | 2/2004 |

* cited by examiner 7,20
25
21,22
21,22
3
Areas passed over 25
21,22
V profile
3

21,22
25
21,22
Areas passed over
3

7,26
21,24
25
Areas passed over 21,24
25
21,24
V profile

Areas passed over

PRINTER CONFIGURATION DETERMINED BY FORMAT ON A PRINT MEDIUM

CROSS-REFERENCE TO RELATED APPLICATIONS

This application is a U.S. national stage application of International Application No. PCT/EP2005/051067 filed Mar. 10, 2005, which designates the United States of America, and claims priority to German application number DE 10 2004 013 160.0 filed Mar. 17, 2004, the contents of which are hereby incorporated by reference in their entirety.

TECHNICAL FIELD

The invention relates to an arrangement having a printer, in particular for a digital tachograph in a motor vehicle, comprising a printing unit for printing a print medium. Besides this, a method for printing a print medium by means of a printer, in particular a digital tachograph, is a subject of the invention. In addition, a print medium, in particular for a digital tachograph in a motor vehicle, is a subject of the invention.

BACKGROUND

Printing apparatus of the aforementioned type is frequently used to output specific reports about system states or parameter configurations, for example. A device of this type has already been disclosed by European patent EP 0 918 222 B1. In particular in a digital tachograph, various types of reports or assemblages of information can be output upon request by means of a printing operation on a print medium which, as a rule, is part of a paper supply wound up on a roll. In order to request such an assemblage of information as a printout, it is always necessary to specify the request in more detail, which is normally done within a menu-driven query procedure. In particular within the context of the use of the subjects mentioned at the beginning in conjunction with a digital tachograph, the menu-guided specification of the desired printout is a procedure that is complicated and prone to errors, since the extremely limited space in the region of the motor vehicle cockpit permits only a small-format operating unit. Accordingly, because of the lack of a large number of operating elements, a particularly deep menu structure is chosen in order to ensure all the required functional variety, which makes the choice of the desired assemblage of information of the printout additionally time-consuming. Furthermore, the patience of the user is tested unduly by the fact that the display of the user guide is normally assisted only by means of acronyms and therefore comprehensive reading of the operating instructions is needed in order to handle the device correctly.

SUMMARY

Starting from the problems and disadvantages of the prior art, the invention is based on the object of simplifying the handling of a printer, in particular for a digital tachograph in a motor vehicle.

In order to achieve the object, the invention proposes an arrangement of the type mentioned at the beginning in which the print medium, in addition to the size format, has an additional configuration, and the printing unit outputs a specific content of the printout onto the print medium as a function of the design of the additional configuration.

In addition to the arrangement, in order to achieve the aforementioned object, a method of the type mentioned at the beginning is proposed which, in particular, can be carried out with a printer of a digital tachograph of the above construction, in which a printing unit prints a print medium, the print medium, in addition to the size format, has an additional configuration, the printing unit outputs a specific content of the printout onto the print medium as a function of the design of the additional configuration.

According to the invention, in order to achieve the object, in addition a print medium is provided which, in addition to the size format, has an additional configuration, whose design can be detected by a printer, a printing unit of the printer outputting a specific content of the printout onto the print medium as a function of its design.

A decisive advantage of the invention resides in the fact that, by means of the additional configuration of the print medium, the printer is informed as to which type of printout is desired without the complicated entry of a specification of the desired assemblage of information. The additional configuration can be a particular color of the print medium or a particular pattern, if appropriate at only specific points of the print medium, or else a specific external contour, for example the edge of a print medium formed as a paper strip and leading into an insertion device can have a special contour. When forming the contour, in principle all geometric configurations are conceivable which do not unduly restrict the suitability as a print medium, for example a specific number of sharp zigzags or rounded tongues. In principle, specific embossing is also conceivable, in particular when the print medium is paper. One advantageous development of the arrangement according to the invention provides for the printer to have at least one sensor by means of which the additional configuration can be detected, the sensor reports the design of the additional configuration to a control unit, the control unit assigns the design of the additional configuration to a specific content of the printout, which the printing unit prints onto the print medium. The fact that the control unit performs an assignment of the additional configuration to the content of the printout means that the additional configuration can be designed particularly simply and does not have to contain all the information as to what is to be included in the content of the printout. For this purpose, the controller can have an internal memory, in which an assignment of various additional configurations to specific contents of the printout is stored. In this way, the additional configuration can, for example, be a simple symbol, to which a complex content of the printout is allocated by means of the assignment in the memory of the controller.

The additional configuration is advantageously detected by means of a sensor belonging to the printer, which in particular is formed as an optical sensor. This ensures wear-free and reliable detection of the additional configuration.

The advantages of the invention come completely to fruition if the printer has an insertion opening into which the print medium can be inserted from outside since, in particular in the case of the small format design in conjunction with a digital tachograph, no internal paper supply is needed and the user, depending on which type of printout he desires, simply inserts the print medium having the additional configuration of his choice into the insertion opening and, in this way, initiates the output of his desired print. In this case, the printer can expediently have a conveying drive which can be operated bidirectionally for conveying the print medium and which is activated in such a way that it begins with the conveyance in a threading direction when the print medium is put in. Firstly, such a procedure gives the user the impression of a particularly high value of the device operated and, secondly, in this way a reproducibly exact transport speed and timely positioning of the print medium can be ensured. This property smoothes the way for further advantages of the invention if the printing unit prints the print medium as it is conveyed in the threading direction or as it is conveyed in an output direction.

Particularly convenient operation with minimal energy consumption at the same time results if the printer is in a rest state and is only transferred into an operating state by the insertion of the print medium. In this case, a sensor arranged in the region of the insertion opening can expediently detect the presence of the print medium and transfer the device into the operating state by means of a message to the control unit.

The print medium is advantageously formed as a paper strip and, in the case of an appropriate length, can have one or more folds. The print medium is expediently configured in sections, in each case one section being provided for exactly one printing operation. The additional configuration can be machine-readable, in particular detectable by means of a sensor. Besides that, it is expedient either to form the additional configuration itself also such that it is human-readable or to provide the print medium with an additional description of the content of the printout to be expected when used. Accordingly, the additional configuration can consist in a machine-readable or machine-readable and human-readable marking or symbols.

In order to increase the usefulness of the printed print medium, the print medium can be provided with an original layout, so that the printout and the original layout supplement each other. In this case, the supplementation is intended in particular to increase human legibility but can also simplify machine reading. The additional configuration can also consist in the provision of this original layout.

BRIEF DESCRIPTION OF THE DRAWINGS

In the following text, the invention is described in more detail by using a specific exemplary embodiment for clarification. In addition to this exemplary embodiment, numerous other configuration possibilities emerge for those skilled in the art from the invention described here. In particular, the invention also includes feature combinations which result from combinations of the claims, even if no corresponding express back-reference is listed. In the drawing:

DETAILED DESCRIPTION

Figure 1:
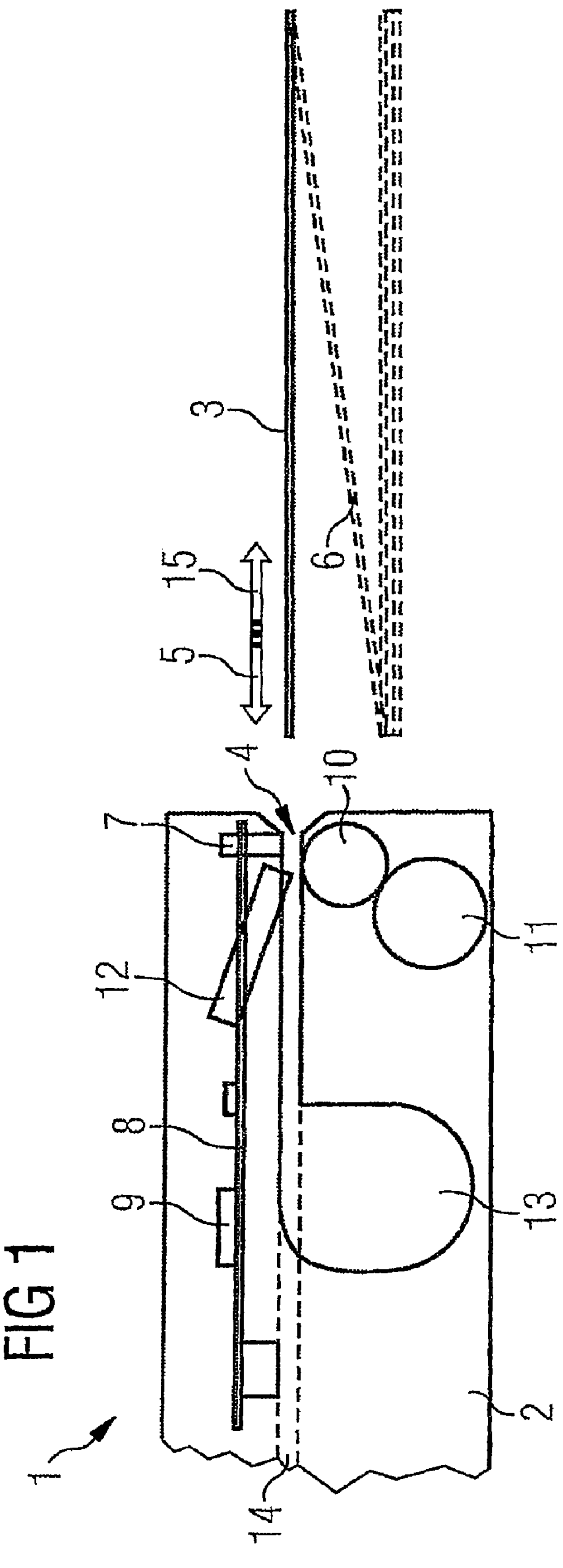
FIG. 1 shows a schematic illustration of a section through a printer according to the invention with print medium according to the invention.

In FIG. 1, an arrangement 1 according to the invention having a printer 2 and a print medium 3 is illustrated. The printer 2 has an insertion opening 4, into which the print medium 3 can be put along a threading direction 5. The print medium 3 can be folded along the continuation 6 illustrated dotted, depending on length, so that relatively long printouts are also possible and, nevertheless, the user can keep the print medium 3 in a handy format.

In the region of the insertion opening 4 of the printer 2 there is a sensor 7, which detects any presence of the print medium 3 in the region of the insertion opening 4 and reports it to a control unit 9 arranged on a common printed circuit board 8. The detection of the presence of the print medium 3 by means of the sensor 7 transfers the printer 2 from a rest state (standby) into an operating state, and the control unit 9 signals a conveying drive 10 having a stepping motor 11 to transport the print medium 3 in the threading direction 5. At the same time, a printing unit 12 arranged on the common printed circuit board 8 and belonging to the printer 2 prints the print medium. Depending on the length of the print medium 3, transport into an internal stowage space 13 takes place. Alternatively, a channel 14 is provided in continuation of the insertion opening 4 (illustrated dashed) in order to transport the print medium 3 further into the printer 2. Following the conclusion of the printing operation, the conveying drive 10 transports the printed print medium 3 counter to the threading direction 5 in an output direction 15, so that a user can accept the output and printed print medium 3.

Figures 2A, 2B, 2C, 2D, 2E, 2F:
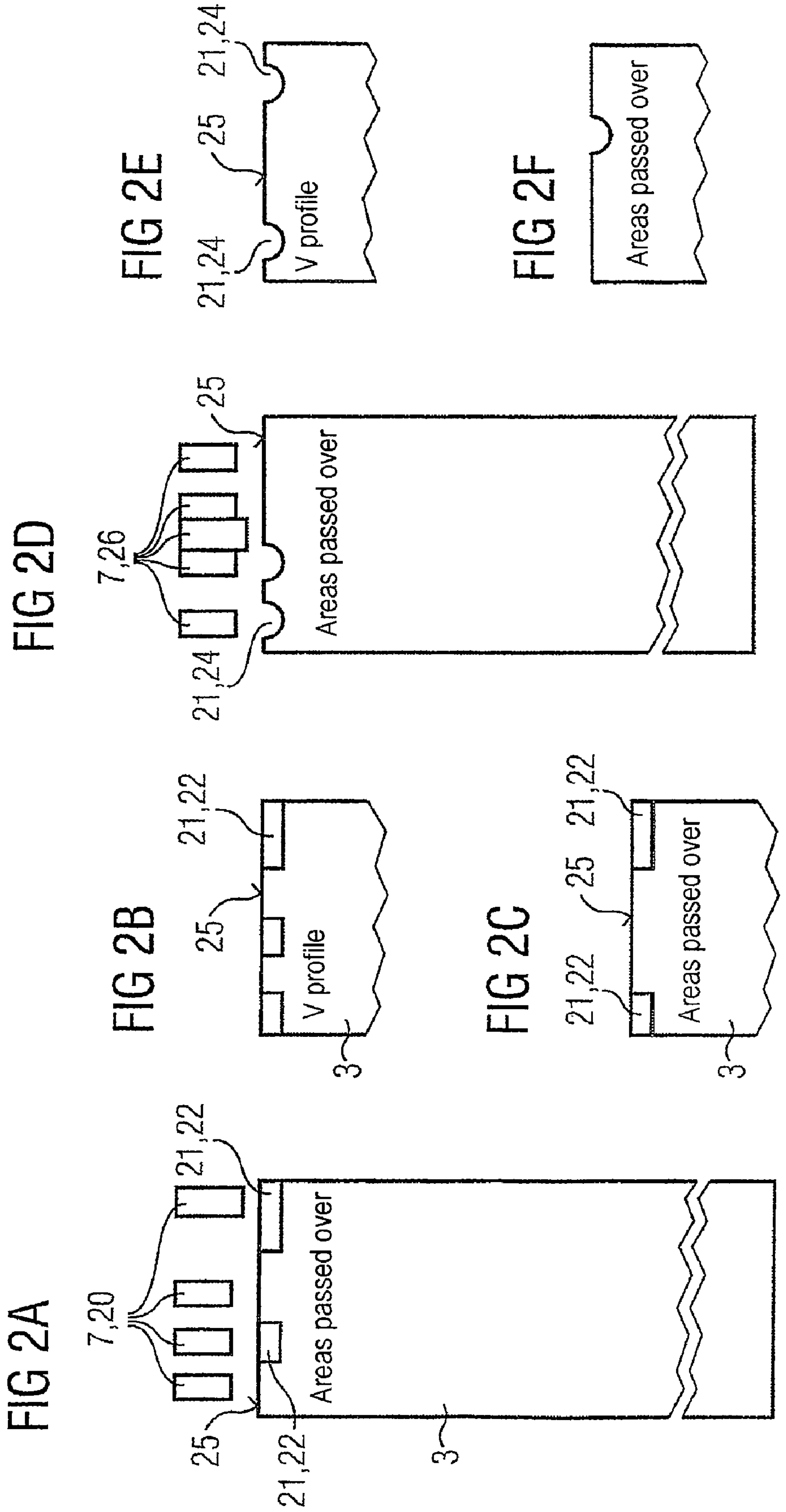
FIG. 2 shows a schematic illustration of a print medium according to the invention in plan view.

In this case, the print medium 3 is provided with an additional configuration 21, illustrated in FIG. 2, the nature of which is detected by the sensor 7, which reports the design of the additional configuration 21 to the control unit 9. Depending on the nature of the additional configuration 21, the control unit 9 assembles the content of the printout which is to be output onto the print medium 3 and activates the printing unit 12 appropriately. To this end, the control unit 9 has in an internal memory an assignment of designs of additional configurations 21 to contents of printouts.

FIG. 2 shows various designs of paper print medium 3 (*a-f*), the designs a, b, c having an additional configuration 21 in the form of a colored or black marking 22. The designs d, e, f of paper print medium 3 have additional configurations 21 in the form of cutouts 24 in the region of the edge 25 leading in the threading direction 5.

Corresponding to the respective design of the additional configuration 21, in each case an expedient arrangement 20, 26 of sensors 7 for the markings 22 and for the cutouts 24 is illustrated in FIG. 2.

Figure 3:
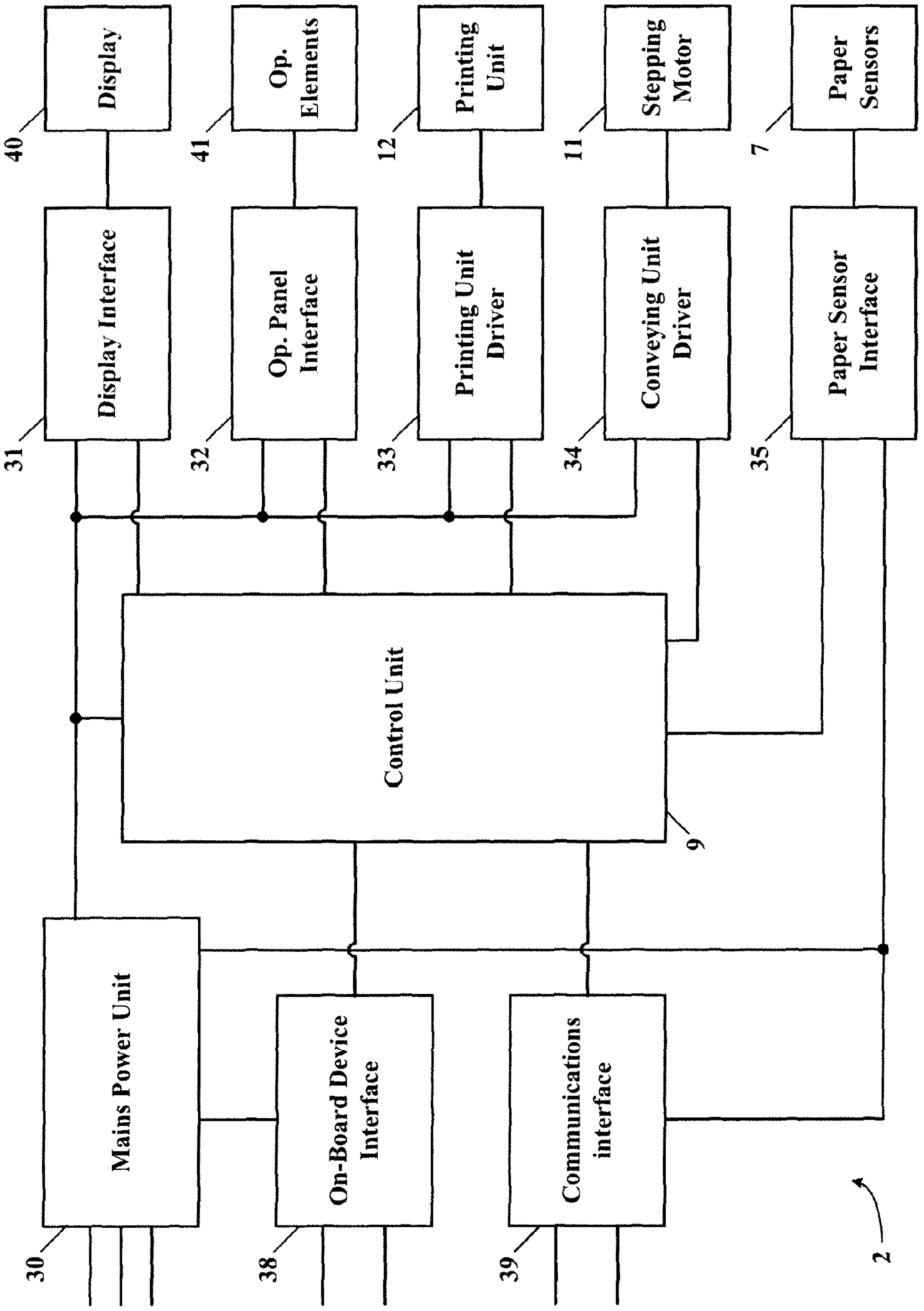
FIG. 3 shows a schematic illustration of the structure of a printer according to the invention.

The illustration of FIG. 3 shows the basic assembly of various components of a printer 2 according to the invention. A mains power unit 30 is connected to a control unit 9, a display interface 31, an operating panel interface 32, a conveying unit driver 34 of the stepping motor 11 of the conveying drive 10 and also a paper sensor interface 35 for the sensors 7, and supplies these components with the operating power. In addition, the mains power unit is also connected to an on-board device interface 38 and a communications interface 39, which likewise communicate with the control unit 9. With the input of print medium 3, the sensor 7 registers the presence and the paper sensor interface 35 reports the detection to the control unit 9, which is transferred from a rest state into an operating state and, by means of the conveying unit driver 34, arranges for the stepping motor 11 of the conveying drive 10 to transport the print medium 3 in the threading direction 5. At the same time, the control unit 9 coordinates the printing unit 12 by means of the printing unit driver 33 the output of the contents of the printout in the assemblage predefined by the additional configuration 21 of the print medium 3. These operations are displayed to the user by means of a display 40 coordinated by the control unit 9, it being possible for said user to intervene in the printing operation by means of operating elements 41.

What is claimed is:

1. A motor vehicle tachograph printer for printing on a print medium, comprises:

a printing unit for printing on the print medium;

a conveying drive for moving the print medium in and out of the printer;

at least one sensor for determining the locations of one or more printed markings on the print medium; and a control unit coupled to the printing unit, the conveying unit and the at least one sensor, wherein the control unit is configured to:

store information regarding a plurality of different print configuration designs, including (a) locations for one or more printed markings corresponding to each different print configuration design and (b) print content corresponding to each different print configuration design;

identify, based on the stored information, a particular one of the print configuration designs corresponding to the locations of the one or more printed markings determined by the at least one sensor;

identify, based on the stored information, the print content corresponding to the identified particular configuration design; and activate the printing unit to print the identified print content onto the print medium.

2. The tachograph printer according to claim 1, wherein the tachograph printer has an insertion opening, the conveying drive operates bidirectionally for conveying the print medium in and out of the tachograph printer and which is activated in such a way that it begins when the print medium is placed into the insertion opening in a threading direction.

3. The tachograph printer according to claim 2, wherein the printing unit prints on the print medium as it is conveyed in the threading direction or as it is conveyed in an output direction.

4. The tachograph printer according to claim 1, wherein the print configuration design further defines one or more of a color and an edge contour.

5. The tachograph printer according to claim 1, wherein the print medium is a paper strip.

6. The tachograph printer according to claim 5, wherein the paper strip has at least one fold.

7. The tachograph printer according to claim 1, wherein the print medium is provided with a human-readable marking or symbols identifying the specific content of the printout.

8. The tachograph printer according to claim 1, wherein the conveying drive is a stepping motor.

9. The tachograph printer according to claim 1, further comprising:

operating elements coupled to the control unit, wherein the operating elements are used to input information into the control unit;

a display panel coupled to the control unit, the display panel adapted for displaying information from the control unit to a user;

a vehicle parameter interface to the motor vehicle, the vehicle parameter interface supplying vehicle operating information to the control unit; and a communications interface coupled to the control unit.

10. The tachograph printer according to claim 1, wherein the print configuration design is a printed pattern on and biased toward at least one edge of the print medium.

11. The tachograph printer according to claim 1, wherein the print configuration design further includes is a cutout pattern in at least one edge of the print medium.

12. The tachograph printer according to claim 1, wherein the print medium is a paper print medium.

13. The tachograph printer according to claim 12, wherein the paper print medium is fanfold paper.

14. The tachograph printer according to claim 12, wherein the paper print medium is a paper card.

15. A method for printing on a print medium with a motor vehicle tachograph printer, comprising the steps of:

storing information regarding a plurality of different print configuration designs, including (a) locations for one or more printed markings corresponding to each different print configuration design and (b) print content corresponding to each different print configuration design;

moving the print medium in and out of the printer unit with a conveying drive;

determining the locations of one or more printed markings on the print medium using at least one sensor;

determining, based on the stored information, a particular one of the print configuration designs corresponding to the locations of the one or more printed markings determined by the at least one sensor; and determining, based on the stored information, the print content corresponding to the particular configuration design; and printing the determined print content onto the print medium.

16. The method according to claim 15, wherein the tachograph printer has an insertion opening into which the print medium is inserted for printing.

17. The method according to claim 16, wherein the conveying device draws the print medium into the insertion opening and outputs the print medium therefrom after printing on the print medium.

18. The method according to claim 15, wherein the printing unit is in a rest state and the insertion of the print medium transfers it into an operating state.

19. The method according to claim 15, wherein the print medium is fed to the printing unit in sections, and the feeding of each section initiates a conveying and printing operation, and the output of the printed section concludes the one conveying and printing operation.

20. The method according to claim 15, further comprising the steps of:

inputting information into the control unit with operating elements coupled to the control unit;

displaying information from the control unit to a user with a display panel;

supplying vehicle operating information to the control unit with a vehicle parameter interface; and communicating with the control unit through a communications interface.

* * * * *